United States Patent

[11] 3,578,029

[72] Inventors Roy H. Cullen;
 Charles H. Elliott; Jimmie R. Aker; Harvey
 O. Mohr, Houston, Tex.
[21] Appl. No. 837,245
[22] Filed June 27, 1969
[45] Patented May 11, 1971
[73] Assignee Youngstown Sheet and Tube Company
 Youngstown, Ohio
 Continuation-in-part of application Ser. No.
 648,039, June 22, 1967, now abandoned,
 and a continuation-in-part of 712,163,
 Mar. 11, 1968, now Patent No. 3,499,668.

[54] PIPE
 13 Claims, 4 Drawing Figs.
[52] U.S. Cl. ................................................. 138/133,
 138/134, 138/139
[51] Int. Cl. ................................................ F16l 11/16
[50] Field of Search .......................................... 138/130,
 131, 133, 134, 138, 139

[56] References Cited
 UNITED STATES PATENTS
 3,420,276 1/1969 Skinner et al. ................ 138/131X
 3,506,040 4/1970 Everling et al. ................ 138/130

Primary Examiner—Laverne D. Geiger
Assistant Examiner—Richard J. Sher
Attorneys—J. Vincent Martin, Joe E. Edwards and M. H. Gay ABSTRACT: This invention discloses a flexible pipe suitable for use as a drill string. The construction of the pipe is such that it will withstand high internal and external pressures, will sustain a substantial longitudinal load, and a substantial torque.

PATENTED MAY 11 1971 3,578,029

Roy H. Cullen
Charles H. Elliott
Jimmie R. Aker
Harvey O. Mohr
INVENTORS

BY
ATTORNEYS

PIPE

This application is a continuation-in-part of our copending applications Ser. No. 648,039, filed June 22, 1967, now abandoned and Ser. No. 712,163, filed Mar. 11, 1968, now Pat. No. 3,499,668.

This invention relates to flexible pipe and particularly to pipe which is particularly well suited for use in drilling wells.

U.S. Pat. Nos. 2,815,227 and 3,276,794 illustrate flexible pipe which is suitable for use in a well and which satisfactorily protects a flexible tubular conduit from bursting due to internal pressure. However, heretofore no flexible pipe has been known which is usable for drilling a petroleum well and which will prevent bursting of the pipe due to internal fluid pressure while also preventing collapse of the pipe due to high external fluid pressure such as occurs under certain conditions in a well. Unexpectedly, it was found that the combination of protection against internal and external pressure enhanced the protection against external pressure.

An object of this invention is to provide a pipe which may be used in drilling a petroleum well which is protected against bursting or collapsing due to a pressure differential thereacross.

Another object is to provide a pipe suitable for use in drilling a petroleum well which is protected against gas blistering.

Another object is to provide a flexible pipe construction in which the pipe is protected against collapse or burst due to an excessive pressure differential thereacross in either direction and wherein the collapse means preventing collapse due to external pressure is confined externally to increase the collapse resistance of the collapse means to a substantially greater extent than would be the case if it were without external restraint.

Another object is to provide in a pipe protected against excessive pressure differential a superior burst resistance by employing a helical ribbon of flat steel as a burst-resistance member with aluminum collapse preventing means to give a strength-to-weight ratio which will be a particularly useful in drilling wells at extreme depths.

Another object is to provide a pipe construction having external helically extending layers of wires which provide fluid courses to reduce wall sticking, and which will seal with a blowout preventer.

Other objects, features and advantages of the invention will be apparent from the drawings, the specification and the claims.

In the drawings, wherein like reference numerals indicate like parts,

FIG. 3 is a fragmentary quarter section of a modified form of collapse ring.

Figure 1:
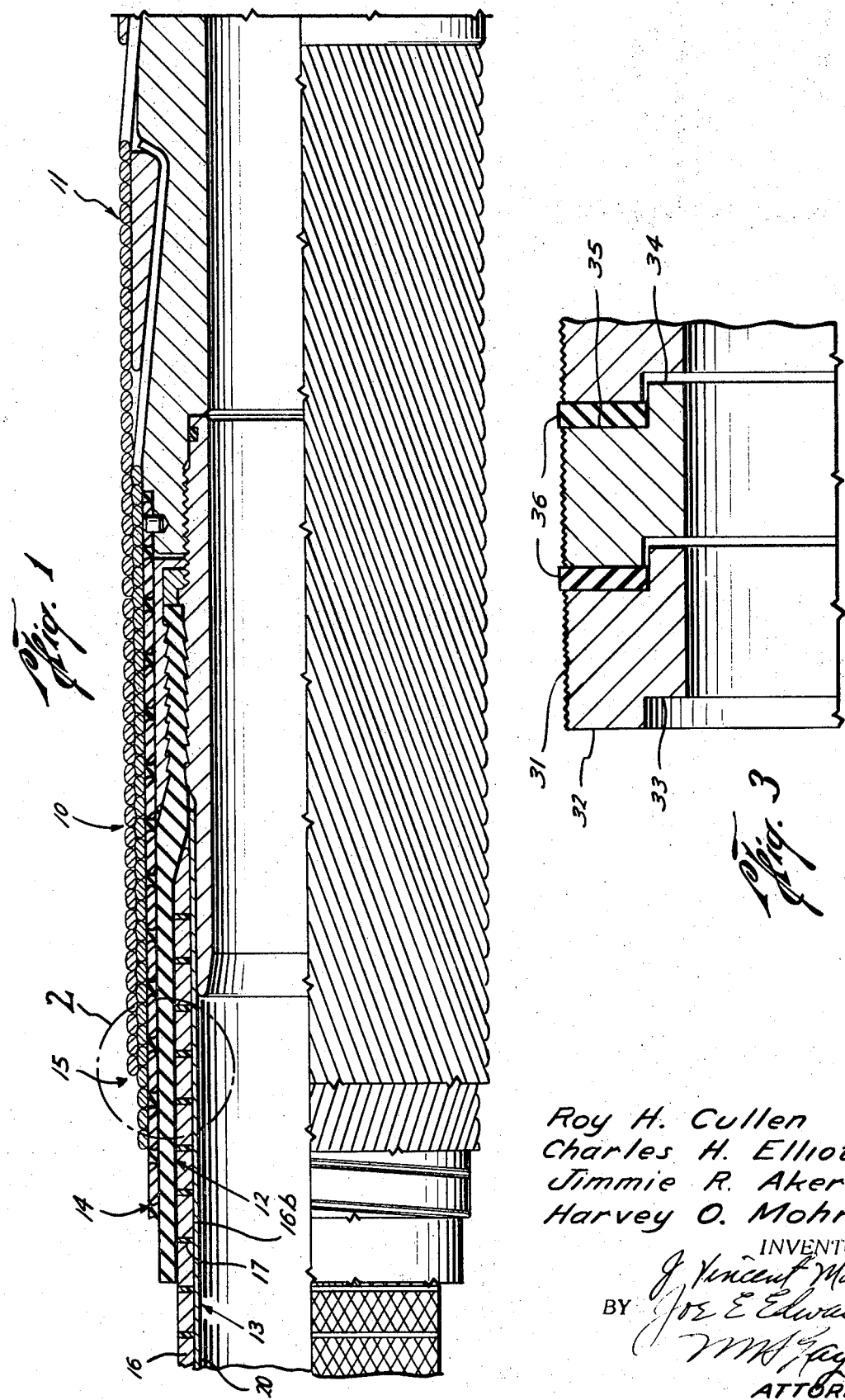
FIG. 1 is a view partially in quarter section and partially in elevation with sections cut away to illustrate a pipe constructed in accordance with this invention.

The pipe of the instant invention may be provided with any desired type of end couplings to couple several sections of pipe together. For instance, the end coupling may be of the form shown in U.S. Pat. No. 3,004,779, and reference is made to this patent for a description Armoring the construction and application of the end coupling to the ends of the pipe. The U.S. this invention indicated generally at 10 is shown with a portion of a preferred form of coupling indicated generally at 11.

Referring now to the construction of the pipe, the construction is one in which the impermeable tube indicated generally at 12 is protected against high external pressure by the collapse liner indicated generally at 13. The tube is also protected against high internal pressure by the burst means indicated generally at 14. Armoring wires indicated generally at 15 overlay the burst-protecting means, preferably in the manner described in U. S. Pat. No. 3,276,794.

Referring first to the collapse rings, these may be individual small rings 16 as shown in the drawings or the collapse means could be provided by any desired flexible means which will support the impermeable member 12 and prevent collapse of the pipe. The collapse-preventing liner should have circumferentially extending spaces between axially adjacent sections to permit the pipe to flex. Preferably these spaces are filled with resilient washers 17, preferably of neoprene. The collapse rings 16 are preferably made of steel, except in those cases where an extremely high strength-to-weight ratio is desired, and in this case a light material such as aluminum may be utilized. The outer surface 16a of the rings 16 is preferably knurled.

The collapse rings 16 may be protected against erosion and corrosion in any desired manner. For instance, they may be coated with a suitable material such as a phenol resin or any other type of thermosetting resin. They also may be coated with any desired metallic compound such as provided by the common galvanizing process. As an alternative, a continuous rubber or synthetic rubber sleeve 20 may extend the length of the pipe within the rings. In this case, the inner surface 16b of the rings 16 may also be knurled.

In manufacturing a pipe in accordance with this invention, the several collapse rings 16 with spacers 17 therebetween are positioned on a mandrel over the sleeve 20, if used, and the pipe is built up in a manner to be explained hereinafter. The spacers hold the rings 16 apart to provide spaces between axially adjacent sections of the liner.

After the collapse rings and spacers have been positioned on the mandrel, a layer of resilient material is applied thereover. Preferably the resilient material is provided by a thin layer of neoprene 18. This may be in the form of neoprene tape of several inches in width which is wrapped over the collapse rings in edge-to-edge abutment.

The tape 18 when wrapped is uncured so that when it is cured, it will adhere to the collapse rings 16.

Means are provided for bridging the gap between adjacent rings 16. A first layer of wires 19 of small size are wrapped on a substantial helix, preferably 54°, over the neoprene 18. These wires are wrapped with adjacent wraps in contact with each other and are wrapped with sufficient tension to embed them in the neoprene and squeeze the neoprene tape tightly against the collapse rings.

A second layer of small wires 21 are wrapped in the opposite direction to the wires 19, also preferably at a 54° helix, with adjacent wires in contact with each other. These wires are also under tension and together with the wires 19 confine the neoprene tape 18 against the collapse rings 16. These two layers of wire bridge the gaps between adjacent rings 16 to prevent extrusion of the tube 12 or sleeve 20 therebetween.

The impermeable tube for containing fluid is provided over the wires 19 and 21. Preferably a plurality of layers of neoprene tape is utilized. In the preferred construction, layers 22, 23 and 24 of uncured neoprene tape reinforced with fiberglass fabric within the tape provide the impermeable tube. The tapes are wrapped successively in edge-to-edge abutment with seams staggered.

Over the impermeable member there is provided another pair of layers 25 and 26 of helically extending wires wrapped in opposite directions, preferably at 54°. These wires may be identical with wires 19 and 21.

Preferably the pipe construction as thus far defined is placed in an autoclave and the neoprene cured in the conventional manner to adhere the neoprene to the collapse rings 16 and wires 19, 21, 25 and 26 and to form a continuous impervious tubular member with the layers of tape 22, 23 and 24.

Figure 2:
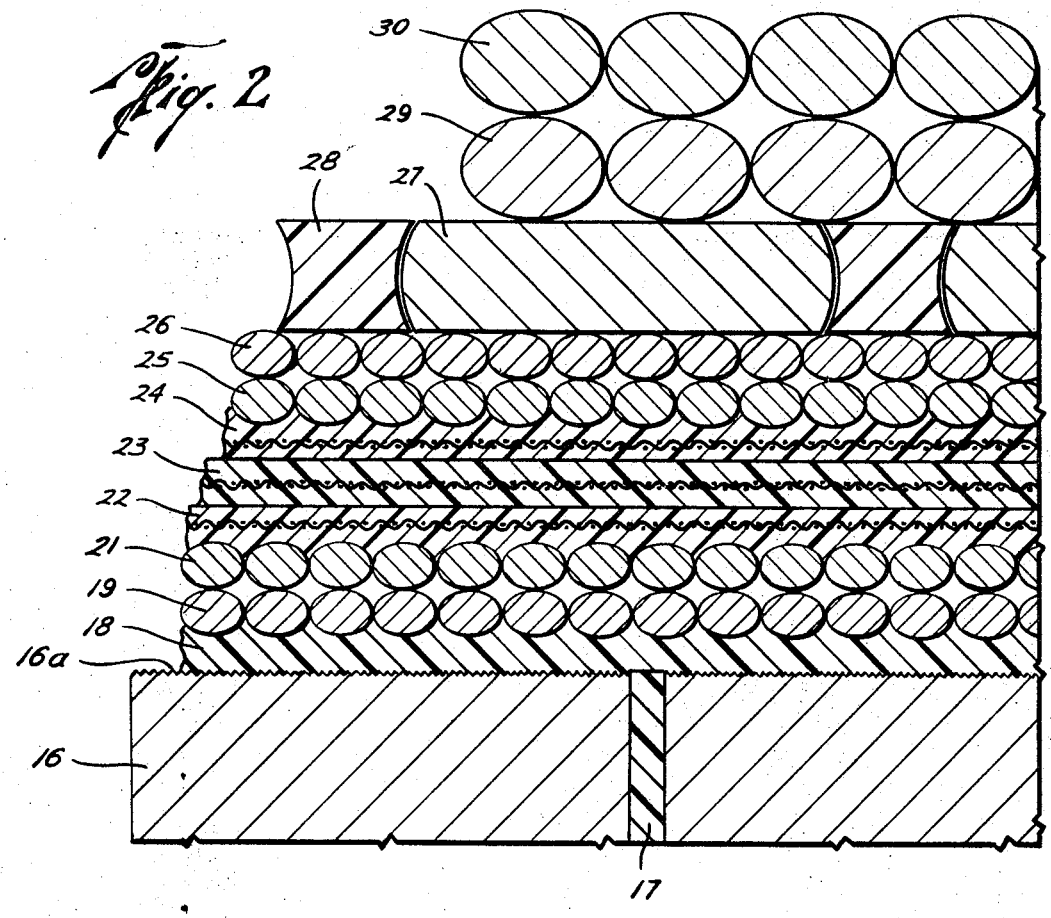
FIG. 2 is a sectional view of a portion of the flexible pipe construction of FIG. 1 taken within the circle designated by the numeral 2 in FIG. 1.

FIG. 2 shows the individual layers of tape 22, 23 and 24 for purposes of illustration, but it will be understood that when cured, these layers form a continuous one-piece tube 12.

A burst-preventing means is then provided over the outer wire wraps 24 and 25. This burst-preventing means may take any desired form, which has substantially rigid means extending circumferentially of the pipe to confine the tube 12. Preferably a flat coil spring 27 is utilized. The flat coil spring is preferred over other forms of burst-preventing means, such as rings, for ease of assembly, economy and because it can be drawn tightly over the wires 26. In order not to inhibit flexing of the pipe, the burst-preventing means has spaces which extend circumferentially between axially adjacent sections thereof. In the preferred form the spring 27 is formed with a slight space between convolutions and this space is filled with a spacer formed from a continuous ribbon of neoprene 28. In assembly the spring 27 and neoprene strip 28 are positioned over the wires 26, and a suitable strap wrench is utilized to shrink the spring 27 into tight engagement with the exterior of wires 26. The wires 25 and 26 bridge the spaces between adjacent convolutions of the spring 27 and prevent extrusion of the tube 12 through the spaces. The tightly wrapped assembly of springs 27, wires 25 and 26, tube 12, and wires 19 and 21 against collapse rings 16 aid substantially in maintaining the collapse rings circular when subjected to external pressure, thus enhancing their collapse resistance. Tests without wires 29 and 30 have proved that confining the collapse rings in this manner results in as much as a 25 percent increase in the resistance of the collapse rings to collapsing.

Thereafter the outer armoring wires 29 and 30 are applied in the manner described in U. S. Pat. No. 3,276,794. The wires 29 and 30 are applied under substantial tension and provide longitudinal strength to the pipe and protection against external mechanical forces, such as abrasion.

In the event of high external pressure being applied to the pipe, a portion of the force is transmitted to the resilient tube 12. The tube is prevented from flowing under this force as it is supported by the collapse rings 16. The wires 19 and 21, extending at a substantial helical angle relative to the spaces between the collapse rings 16, will bridge the spaces between the collapse rings, support the resilient tube and prevent it from flowing between the collapse rings. In this manner the pipe is protected against high external pressure.

In the event of a high internal pressure, this pressure will be exerted against the tube 12 from the inside and urge the tube against the outer confining wires 25 and 26. As these wires are at a substantial helix angle relative to the spaces between successive convolutions of the spring 27, the spaces between the spring are bridged. The outer armoring wires 29 and 30 reinforce the spring 27, and their combined strength supports the tube 12 against the internal pressure.

Under high pressure, gas will sometimes work its way into an elastomer such as tube 12. When the pipe is pulled from a well and subjected to atmospheric pressure, blisters would form from any contained gas, if the tube were not supported. These blisters might burst and weaken the tube. The several wires 19, 21, 25 and 26 confine the tube and prevent blisters from forming.

FIG. 3 illustrates a modified collapse liner ring 31. The ring has interlocking steps in confronting faces. In one face 32, a groove 33 is cut opening into the bore through the ring. In the other face 34, a groove 35 is cut opening to the exterior surface of the ring. The step thus provided when the rings are assembled in interlock position has a slight clearance to permit relative canting of the rings when the pipe is bent. A resilient washer 36 holds the rings out of abutment to provide for canting therebetween. These rings 31 are substituted for rings 16 in the previously described form of the invention.

Figure 4:
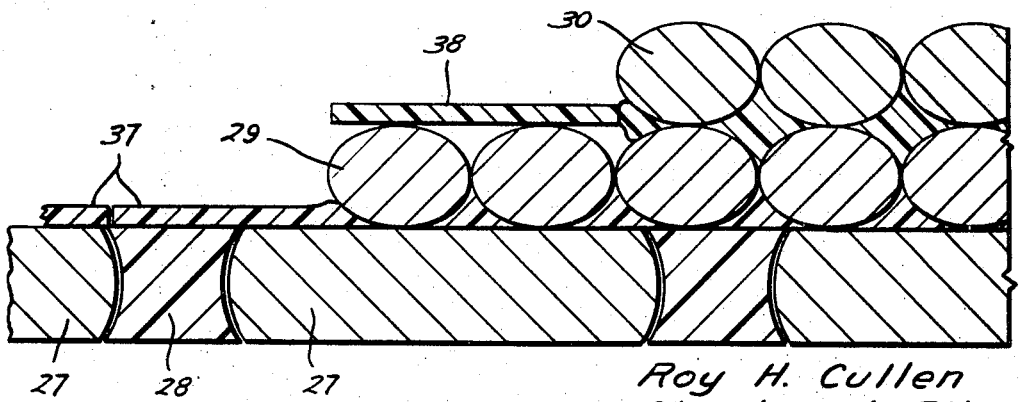
FIG. 4 is a fragmentary view partially in elevation and partially in cross section illustrating a modified form of this invention.

FIG. 4 illustrates a form of the invention for sealing with a blowout preventer. The tube 12 and collapse rings 16 may be constructed as shown in FIG. 2. An entire section of the pipe may be constructed in this manner, or, as an alternative, one or more sections or portions of sections of the pipe may be constructed in this manner. Prior to applying the wires 29 and 30, a layer of uncured neoprene 37 is wrapped over spring 27. The wire layer 29 is then applied over the wires under substantial tension to squeeze the neoprene into the interstices between the wires to seal therebetween. A second layer 38 of neoprene is wrapped over wires 29. Wire layer 30 is then applied. The wire layer 30 will squeeze neoprene layer 38 into the interstices between the wires of layers 29 and 30 and seal therebetween. The wires cut through the neoprene, and the layers of wires contact each other and the inner layer contacts spring 27. Preferably, just enough neoprene is utilized to fill all interstices interior of the points of contact of the wires of layer 30. Thus, the exterior interstices will be open and provide special channels for fluid flow to reduce any tendency of the pipe to stick when fluid loss in a well results in a differential which tends to hold the pipe against the wall of the well. Though uncured, the neoprene will slowly cure with time sufficient to provide the desired seal.

In place of the neoprene 37 and 38, and other elastomer may be used. For instance, the pipe may be wiped with synthetic liquid rubber, such as Buna-N, a product of B. F. Goodrich known as "Hycar" MTBN. The "Hycar" may be set with an epoxy such as Shell Epon 828 or 815 catalized with DMP30, a product of Rohm and Haas Chemical Company.

When a blowout preventer is closed about the pipe of FIG. 4, the elastomer on the face of the rams will flow into the external interstices and seal with the wires of layer 30. The elastomer provided by layers 37 and 38 will seal against bypass of fluid, resulting in a complete seal.

If the entire pipe is constructed as in FIG. 4, a good seal may be obtained along the pipe. However, if only a section, preferably adjacent the end couplings, is so constructed, the interstices between the wires of wraps 29 and 30 are available as fluid channels to provide antisticking protection. Pipe of both design may be used in a drill string if desired. The FIG. 3 form or a form of FIG. 4 with filled interstices adjacent couplings may be used until a high-pressure formation is reached. Then the form of FIG. 4 with filled interstices along the entire length may be used. This provides maximum antistick and blowout preventer seal characteristics.

While the wires 19, 21, 25 and 26 are shown as round in cross section, they may take any other configuration. They may be wrapped, braided or otherwise applied in any desired fashion. The sealing tube 12 may be provided by any flexible impermeable member desired. Obviously, the configuration of the burst-preventing means and collapse preventing liner could be interchanged, and a continuous member substituted for separate rings and vice versa. Also, the liner and burst-preventing means could both be either rings or springs.

The burst-preventing means is shown as a flat ribbon spring of high tensile steel to give strength while occupying a very small percentage of the wall thickness of the pipe. Other configurations may be used, but the flat spring is preferred.

It will be appreciated that in curing the neoprene layers 18, 22, 23 and 24, the neoprene tube and wires 19, 21, 25 and 26, as well as rings 16, are all firmly anchored together to hold the rings 16 in fixed position in the pipe.

We claim:

1. A flexible pipe construction suitable for use in drilling a petroleum well comprising:
    an impermeable flexible tube,
    circumferentially extending flexible metallic means confining said tube and preventing burst of said tube due to internal pressure,
    said burst-preventing means having circumferentially extending spaces between axially adjacent sections to permit the pipe to flex,
    flexible metallic wires extending at a substantial helix angle between the flexible tube and burst-preventing means to bridge said spaces and prevent extrusion of said tube into said spaces due to internal pressure,
    a collapse-preventing liner within said tube having circumferentially extending spaces between axially adjacent sections to permit the pipe to flex,
    flexible metallic wires extending at a substantial helix angle between the tube and liner to bridge said spaces in the liner and prevent extrusion of said tube into said spaces due to external pressure, and at least two oppositely extending helically wrapped layers of wire exterior of said burst-preventing means.

2. The pipe of claim 1 wherein said burst-preventing means and the first-mentioned flexible metallic wires load said collapse-preventing liner to increase the collapse resistance of the liner.

3. The pipe of claim 1 wherein the burst-preventing means is a high tensile strength ribbon-type spring.

4. The pipe of claim 1 wherein the liner is embedded in a protective material.

5. The pipe of claim 1 wherein the liner is a plurality of spaced metallic rings.

6. The pipe of claim 1 wherein the burst-preventing means is a high tensile strength ribbon-type spring and the liner is a plurality of spaced metallic rings.

7. The pipe of claim 1 wherein resilient spacers are provided in said spaces in the liner.

8. The pipe of claim 1 wherein said liner is provided by a plurality of separate rings having interlocking steps in confronting faces thereof and a resilient washer between said rings.

9. The pipe of claim 1 wherein an elastomer seals between said helically wrapped layers of wire and between the innermost helically wrapped layer and said burst-preventing means along at least a portion of the length of the pipe, the external interstices between wires in the external wire layer providing fluid courses.

10. A flexible pipe construction suitable for use in drilling a petroleum well comprising:

a flexible tube extending from end to end of each section of the flexible pipe, a helical spring surrounding said flexible tube and preventing said tube from bursting due to internal fluid pressure, flexible metallic wires extending helically between the flexible tube and spring and bridging the gaps between convolutions of the spring to prevent extrusion of the tube into said convolutions due to internal fluid pressure, a collapse-preventing liner having spaces between axially adjacent sections to permit the liner to flex, flexible metallic wires extending helically between the flexible tube and liner to prevent extrusion of the tube into said spaces in the liner due to external fluid pressure, and at least two oppositely extending helically wrapped layers of wire exterior of said spring.

11. The pipe of claim 10 wherein the spring is a high tensile strength ribbon-type spring.

12. The pipe of claim 10 wherein the liner is embedded in a flexible protective material.

13. The pipe of claim 1 wherein the last-mentioned layers of wire engage each other and the innermost thereof engages said burst-preventing means and wherein an elastomer seals between said helically wrapped layers of wire and between the innermost helically wrapped layer and said burst-preventing means along at least a portion of the length of the pipe, the external interstices between wires in the external wire layer providing fluid courses.